(12) United States Patent
Liu et al.

(10) Patent No.: US 12,563,108 B2
(45) Date of Patent: Feb. 24, 2026

(54) AUDIO VIDEO CAPABILITY NETWORK ELEMENT AND METHOD FOR MULTIMEDIA PROCESSING

(71) Applicants: CHINA MOBILE GROUP DESIGN INSTITUTE CO., LTD., Beijing (CN); CHINA MOBILE COMMUNICATIONS GROUP CO., LTD., Beijing (CN)

(72) Inventors: Lei Liu, Beijing (CN); Zheng Feng, Beijing (CN); Jia Liu, Beijing (CN); Xiyuan He, Beijing (CN); Gang Wang, Beijing (CN); Xuguang Li, Beijing (CN); Shengtai Tian, Beijing (CN)

(73) Assignees: CHINA MOBILE GROUP DESIGN INSTITUTE CO., LTD., Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 243 days.

(21) Appl. No.: 18/694,643

(22) PCT Filed: Oct. 31, 2023

(86) PCT No.: PCT/CN2023/128432
§ 371 (c)(1),
(2) Date: Mar. 22, 2024

(87) PCT Pub. No.: WO2024/093996
PCT Pub. Date: May 10, 2024

(65) Prior Publication Data
US 2025/0126157 A1 Apr. 17, 2025

(30) Foreign Application Priority Data
Nov. 2, 2022 (CN) .......................... 202211362496.8

(51) Int. Cl.
*H04L 65/1046* (2022.01)
*H04L 51/10* (2022.01)
*H04L 65/1069* (2022.01)

(52) U.S. Cl.
CPC .......... *H04L 65/1046* (2013.01); *H04L 51/10* (2013.01); *H04L 65/1069* (2013.01)

(58) Field of Classification Search
CPC . H04L 65/1046; H04L 51/10; H04L 65/1069; H04L 65/1016; H04L 65/1104;
(Continued)

(56) References Cited

U.S. PATENT DOCUMENTS

2007/0213078 A1* 9/2007 Shaheen ............. H04L 65/1016
455/466
2021/0120627 A1* 4/2021 Ayaz ................... H04L 65/1069
(Continued)

FOREIGN PATENT DOCUMENTS

CN 114629778 A 6/2022
CN 116915750 A 10/2023

OTHER PUBLICATIONS

International Search Report for corresponding PCT/CN2023/128432, completed Jan. 16, 2024, with English translation (16 pages).
Haifeng, Huang, China Mobile and Huawei practice "cloud-based" metropolitan area network to solve the bottleneck of network development, Technology technology, Dec. 31, 2017, with English Translation (6 pages).
(Continued)

*Primary Examiner* — Johnny B Aguiar
(74) *Attorney, Agent, or Firm* — Maginot, Moore & Beck, LLP

(57) ABSTRACT
Embodiments of the disclosure relate to a field of communication technologies. An audio video capability network element is disclosed. The audio video capability network element includes a control plane device, deployed near a core network and a service network element in a centralized manner; and a media plane device, deployed in a distributed
(Continued)

manner. The control plane device is respectively communicated with the service network element, the core network and the media plane device; and the media plane device is respectively communicated with the service network element, the control plane device and the core network. In this way, the embodiments of the disclosure achieves the cost reduction while the user experience is improved.

18 Claims, 4 Drawing Sheets

(58) Field of Classification Search
CPC ..... H04L 65/80; H04L 65/1013; H04L 51/08; H04L 67/06
See application file for complete search history.

(56) References Cited

U.S. PATENT DOCUMENTS

| | | | |
|---|---|---|---|
| 2021/0352457 A1* | 11/2021 | Zhou | H04W 76/12 |
| 2022/0046067 A1* | 2/2022 | Schmidt | H04L 65/1016 |
| 2023/0353603 A1* | 11/2023 | Shen | H04L 65/1069 |
| 2025/0047572 A1* | 2/2025 | Liu | H04L 65/1016 |

OTHER PUBLICATIONS

3rd Generation Partnership Project Technical Specification Group Services and System Aspects, Functional architecture and information flows to support Mission Critical Push To Talk (MCPTT), Stage 2 (Release 14), 3GPP, Dec. 2, 2016.

* cited by examiner

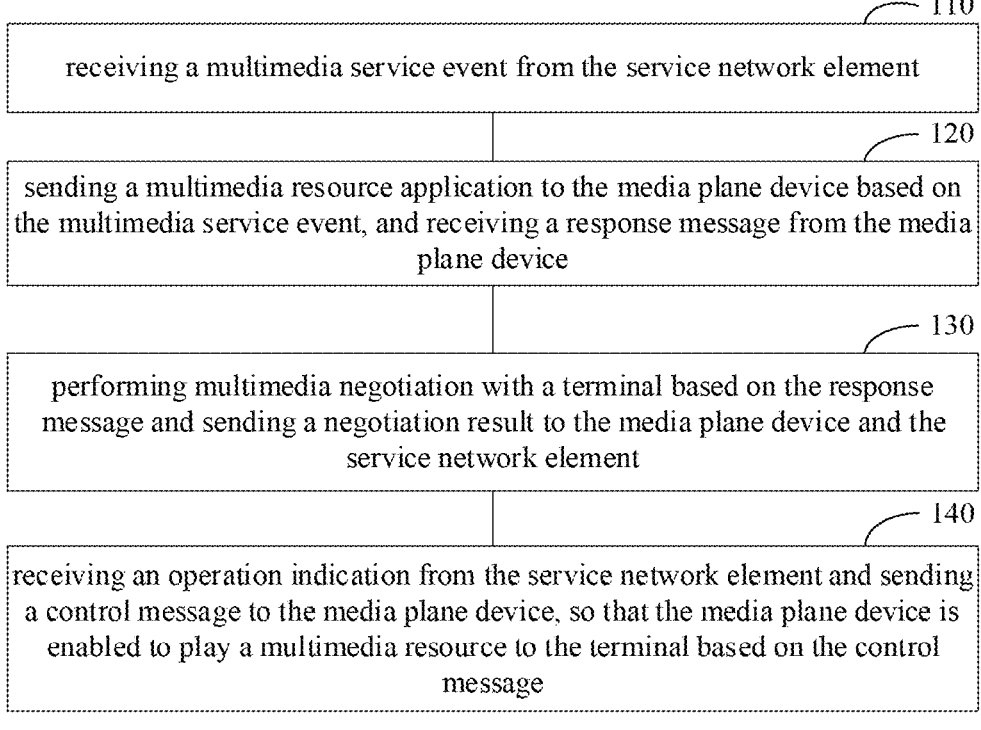

110 receiving a multimedia service event from the service network element

120 sending a multimedia resource application to the media plane device based on the multimedia service event, and receiving a response message from the media plane device

130 performing multimedia negotiation with a terminal based on the response message and sending a negotiation result to the media plane device and the service network element

140 receiving an operation indication from the service network element and sending a control message to the media plane device, so that the media plane device is enabled to play a multimedia resource to the terminal based on the control message

FIG. 6

700 processor
701 bus interface
703 transceiver
704 memory
702

FIG. 7

AUDIO VIDEO CAPABILITY NETWORK ELEMENT AND METHOD FOR MULTIMEDIA PROCESSING

CROSS-REFERENCE TO RELATED APPLICATIONS

This application is the U.S. National Stage Application of International Application No. PCT/CN2023/128432, filed on Oct. 31, 2023, which is based on and claims priority to Chinese Patent Application No. 202211362496.8, filed on Nov. 2, 2022, the entire contents of which are incorporated herein by reference.

TECHNICAL FIELD

Embodiments of the disclosure relate to a field of communication technologies, and specifically discloses an audio video capability network element and a method for multimedia processing.

BACKGROUND

All the functions of an audio video capability network element in the current network are integrated inside the same network element, and centrally deployed in 8-16 central regions in the whole network. For non-central regions, all audio video media are played across regions for a long distance transmission, and a play delay of the media is long, and for services with video requirements such as video-based coloring ring back tone (CRBT), bandwidth requirements of a long-distance transmission and an IP bearing network are high (taking a video-based CRBT as an example, according to a current 720P resolution of a media play, bandwidth requirements of the media play for each 10 million users reach 60 Gbps). As a resolution of video media is higher and higher, bandwidth requirements will be continuously increased (after estimation, taking the video-based CRBT service as an example, when the resolution is enhanced to 1080P in future, bandwidth requirements for each 10 million users reach 150 Gbps). If the resources in the long-distance transmission or the IP bearing network are insufficient, the quality of the audio video media play will be affected, for example, the situations such as mosaic and lag may appear, thereby affecting the user experience.

SUMMARY

According to a first aspect of the present disclosure, an audio video capability network element is provided, and includes: a control plane device, deployed near a core network and a service network element; and a media plane device, deployed separately from the core network and the service network element; in which the control plane device is respectively communicated with the service network element, the core network and the media plane device; and the media plane device is respectively communicated with the service network element, the control plane device and the core network.

According to a second aspect of the present disclosure, a method for multimedia processing is provided. The method is performed by a control plane device included in an audio video capability network element. The method includes: receiving a multimedia service event from a service network element; applying for a multimedia resource from the media plane device based on the multimedia service event, and receiving a response message from the media plane device;

performing multimedia negotiation with a terminal based on the response message and sending a negotiation result to the media plane device and the service network element; and receiving an operation indication from the service network element and sending a control message to the media plane device, so that the media plane device is enabled to play a multimedia resource to the terminal based on the control message; in which the control plane device is deployed with a core network and the service network element, and the control plane device is respectively communicated with the service network element, the core network and the media plane device; the media plane device is deployed separately from the core network and the service network element, and the media plane device is respectively communicated with the service network element, the control plane device and the core network.

According to a third aspect of the present disclosure, a method for multimedia processing is provided. The method is performed by a media plane device included in an audio video capability network element. The method includes: receiving a multimedia resource application from a control plane device included in the audio video capability network element, and sending a response message to the control plane device, so that the control plane device is enabled to perform multimedia negotiation with a terminal based on the response message, in which the multimedia resource application is generated by the control plane device based on a multimedia service event from the service network element; receiving a negotiation result from the control plane device; and receiving a control message from the control plane device, and playing a multimedia resource to the terminal based on the control message, in which the control message is generated by the control plane device based on a received operation indication from the service network element; in which the control plane device is deployed with a core network and the service network element, and the control plane device is respectively communicated with the service network element, the core network and the media plane device; the media plane device is deployed separately from the core network and the service network element, and the media plane device is respectively communicated with the service network element, the control plane device and the core network.

The foregoing description is only a summary of the technical solutions of the embodiments in the present disclosure, and may be implemented according to contents of the description in order to understand the technical means of the embodiments in the disclosure more clearly. In addition, the detailed implementations in the disclosure are given below in order to make other purposes, features, and advantages of the disclosure easier to be understood.

BRIEF DESCRIPTION OF THE DRAWINGS

The accompanying drawings are only for purposes of illustrating the embodiments and are not to be construed as a limitation of the disclosure. The same components are represented by same reference numerals throughout the accompanying drawings.

FIG. 6 is a flowchart illustrating a method for multimedia processing according to embodiments of the present disclosure.

FIG. 7 is a diagram illustrating a structure of a network element device according to embodiments of the present disclosure.

DETAILED DESCRIPTION

Figure 1:
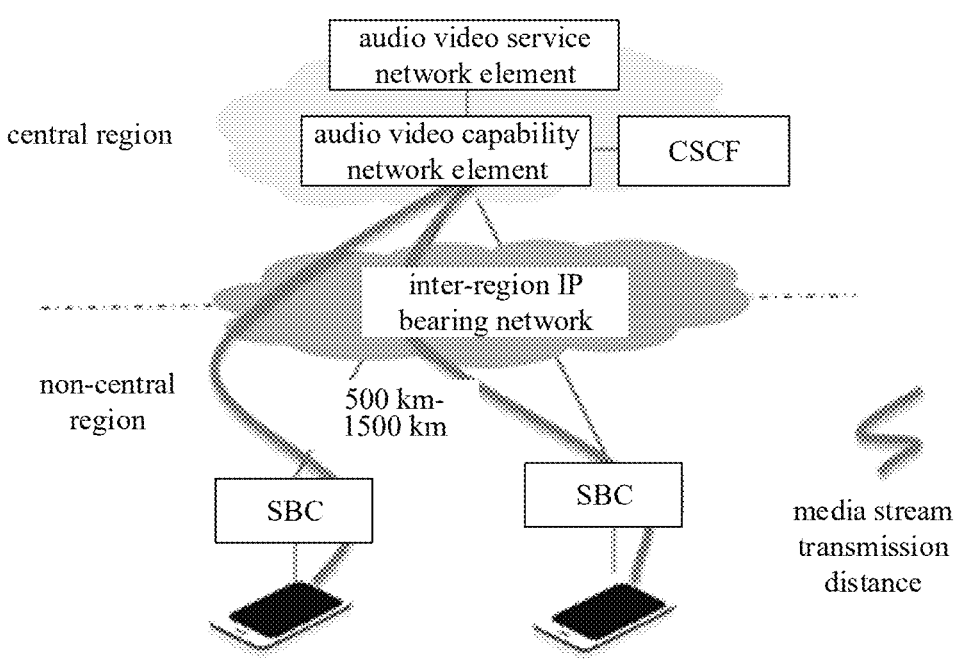
FIG. 1 is a diagram illustrating a structure of an audio video capability network element according to an embodiment of the present disclosure.

Exemplary embodiments of the present disclosure will be described in more detail below with reference to the accompanying drawings. Although the exemplary embodiments of the present disclosure are shown in the drawings, it should be understood that the present disclosure may be implemented in various forms and should not be limited by the embodiments set forth herein.

Firstly, the problems that occur in the existing audio video capability network element are further analyzed below.

An audio video capability network element provides network communication capabilities for an upper layer service system, including call event subscription and notification, call processing, user call state acquisition and audio video media play (such as video-based coloring ring back tone (CRBT) play and recording notification play). The audio video capability network element has been widely applied to service systems such as CRBT, an intelligent network and an IP Multimedia Subsystem (IMS) anti-fraud, and construction and application of the audio video capability network element are introduced in a plurality of fields such as a 5G new call.

As illustrated in FIG. 1, for the audio video capability network element, operators in a current network generally adopt an arrangement manner of integrating various functions, i.e., various functions such as event subscription, call processing, user state acquisition, audio video media play are integrated inside the audio video capability network element (that is, all functions are achieved by a first-class network element). In the context and trend of centralized construction, in order to improve the network operation efficiency, reduce the investment and achieve intensive production, construction and operation, some audio video capability network elements, core network elements and service network elements (for calling audio video capabilities) are deployed in central regions with richer network resources and more robust maintenance capability. The non-central region only retains a few core networks to access a forwarding network element (such as a session border controller (SBC)). The current situation where the audio video capability network elements are centrally deployed enables that all the audio video media plays (such as media plays of a CRBT service and an intelligent network service) in non-central regions are performed across the regions, and a large number of resources in the long-distance transmission and long-distance IP bearing network from the central regions to the non-central regions are thus occupied. With an increasing volume of video services, more and more resources in the long-distance transmission and IP bearing network are inevitably occupied.

If the audio video capability network element is directly deployed within the non-central regions, although the media play no longer occupies resources in a long-distance transmission and an IP bearing network, in the context that the core network and the service network element are still centrally deployed, another problem may occur, that is, a large number of signaling messages (about more than 30 pieces) between the audio video capability network element and the core network or the service network element are connected across the regions for a long distance between the central region and the non-central region. Although a bandwidth occupied by the signaling messages is extremely small, due to a large number of the messages, each of the messages is transmitted in a long distance of 500-1500 KM, which results in a long signaling connection delay and a poor user experience.

Therefore, all the functions of the audio video capability network element in the current network are integrated inside the same network element, and centrally deployed in 8-16 central regions in the whole network. For non-central regions, all audio video media are played across the central regions for a long distance transmission, and a play delay of the media is long, and for services with video requirements such as video-based coloring ring back tone (CRBT), bandwidth requirements of a long-distance transmission and an IP bearing network are high (taking a video-based CRBT as an example, according to a current 720P resolution of a media play, bandwidth requirements of the media play for each 10 million users reach 60 Gbps). As a resolution of video media is higher and higher, bandwidth requirements will be continuously increased (after estimation, taking the video-based CRBT service as an example, when the resolution is enhanced to 1080P in future, bandwidth requirements for each 10 million users reach 150 Gbps). If the resources in the long-distance transmission or the IP bearing network are insufficient, the quality of the audio video media play will be affected, for example, the situations such as mosaic and lag may appear, thereby affecting the user experience. If the audio video capability network element is deployed in a non-central region as a whole, although a long-distance play problem of media may be solved and a bandwidth occupation of the long-distance transmission and an IP bearing network may be reduced, a large number of signaling messages between the audio video capability network element and a core network device or a service network element arranged in the central region are connected across a long distance, thereby resulting in too long signaling connection delay (taking the CRBT service as an example, a distance between a non-central region and a central region is 500 KM to 1500 KM, and a connection delay before the media is connected may be increased by about 300 ms to 900 ms), which also affects the user experience.

Figure 2:
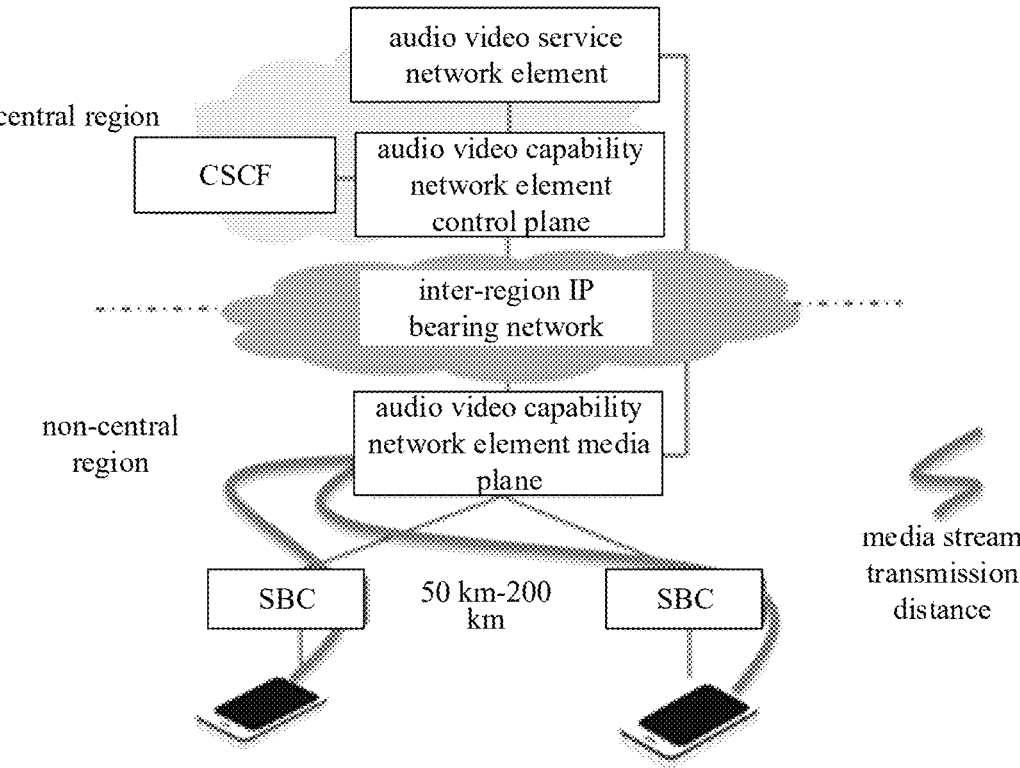
FIG. 2 is a diagram illustrating a structure of an audio video capability network according to embodiments of the present disclosure.

In this regard, an audio video capability network element is provided according to embodiments of the present disclosure. FIG. 2 is a diagram illustrating a structure of an audio video capability network element according to embodiments of the present disclosure. The audio video capability network element includes a control plane device and a media plane device.

The control plane device is deployed near a core network and a service network element in a centralized manner, and the media plane device is deployed in a distributed manner. The control plane device is respectively communicated with the service network element, the core network and the media plane device; and the media plane device is respectively communicated with the service network element, the control plane device and the core network. The control plane device is configured to control the media plane device in the audio video network element, and the media plane device is configured to play audio video media. Specifically, the control plane device communicates with the service network element using a RESTFUL/HTTP (Representational State Transfer/Hypertext Transfer Protocol) message to perform/complete call event notification, call event subscription, capability calling and nesting, and conflict handling; the control plane device intercommunicates with a call session control function (CSCF) network element of the core network using a session initiation protocol (SIP) message to complete signal processing; and the control plane device communicates with the media plane device to perform call control and media negotiation. The media plane device communicates with the service network element using the RESTFUL/HTTP message to complete media download; the media plane device communicates with the control plane device to complete call control and media negotiation; the media plane device communicates with the core network element such as SBS and IP Multimedia Media Gateway (IM-MGW) using a real-time transport protocol (RTP) message to complete media play. The service network element is an audio video service network element. In the embodiments of the disclosure, functions of the audio video capability network element are split and reconstructed. In particular, control functions (such as call event subscription and notification, call signaling processing and user call state acquisition) that are closely related to the core network CSCF and a service network element are separated from media functions (such as audio video media play) that are closely related to the SBC, the network element achieving the control function is defined as the control plane device and the network element with audio video play capabilities achieving the media function is defined as a media plane device. Different functional entities inside the audio video capability network element may be deployed at different positions as required, so that the overall network layout with an open audio and video capability may be more reasonable.

In the embodiments of the disclosure, the control plane device, the core network and the service network element are deployed in a central region; and the media plane device is deployed in a non-central region that is accessed to the central region. The control plane device is still centrally deployed in the central region, while the media plane device is deployed within each non-central region. The control plane device, the core network and the service network element in the upper layer that needs to call the audio video capabilities are deployed together in the central region, with a short distance and a short signaling connection delay. The media plane device in the audio video capability network element is deployed within each non-central region, with a short distance from terminal users and a short media play delay. The media play for a call within a non-central region does not occupy the IP bearing network resources required for transmission across the central regions, thereby saving the resources, reducing the investment costs, and improving the user experiences.

Figures 3, 4:
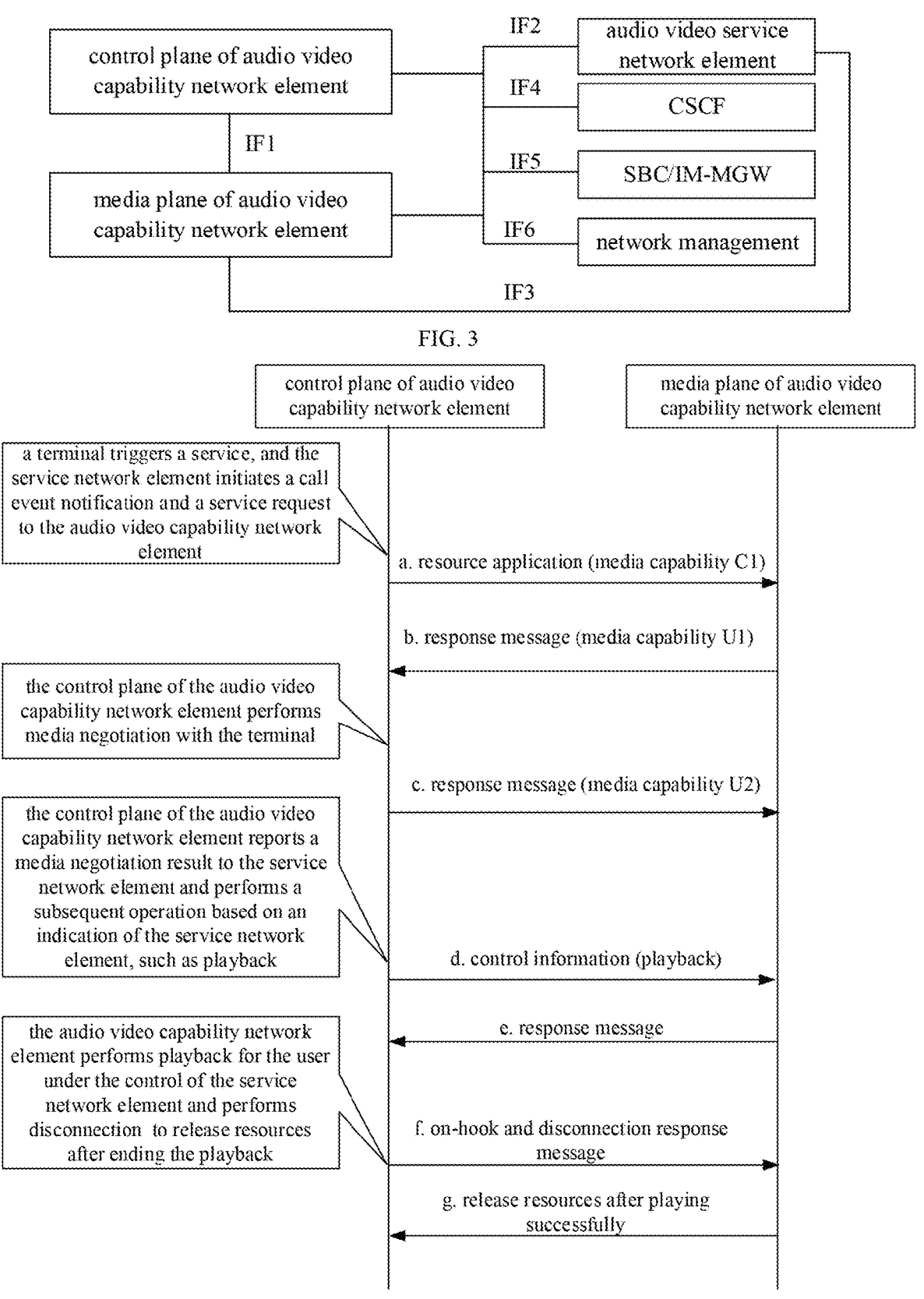
FIG. 3 is a diagram illustrating a structure of interfaces of an audio video capability network according to embodiments of the present disclosure.
FIG. 4 is a flowchart illustrating a signaling interaction of an audio video capability network according to embodiments of the present disclosure.

As illustrated in FIG. 3, in the embodiments of the disclosure, the communication between the control plane device and the media plane device of the audio video capability network element and the communications between the control plane device/media plane device and other devices are performed via a plurality of preset interfaces. The control plane device communicates with the media plane device via an interface IF1 to achieve service control of the control plane device to the media plane device.

The control plane device communicates with the audio video service network element via an interface IF2, and the control plane device communicates with a core network CSCF via an interface IF 4. The media plane device communicates with the audio video service network element via an interface IF 3; the media plane device communicates with the SBC/IM-MGW via an interface IF 5; the media plane device communicates with an element management system via an interface IF 6. Table 1 lists functions and bearing manners of interfaces.

TABLE 1

| No. | Network elements involved | Interface function | Description |
|---|---|---|---|
| IF1 | control plane device <-> media plane device | service control to the media plane device is achieved by the control plane device in the audio video capability network element | newly added interface |
| IF2 | control plane device service network element | calling the audio video capabilities at audio video capability network element level is achieved by the service network element | |
| IF3 | media plane device <-> service network element | acquisition of media contents at the service layer is achieved by the audio video capability network element | |
| IF4 | control plane device <-> CSCF | between the audio video capability signaling interworking is achieved network element and the core network | |
| IF5 | media plane device <-> SBC/IM-MGW | a play of user media is achieved by the audio video capability network element | |
| IF6 | control plane device, media plane device <-> element management system | the function of the element management system is achieved | |

As illustrated in FIG. 4, a working process of an audio video capability network element in the embodiments of the disclosure is as follow:

1. The terminal triggers a service, and the service network element initiates a call event notification and a service request to the audio video capability network element.

2. The control plane device receives the call event notification and the service request initiated by the service network element.

3. The control plane device sends a multimedia resource (a media capability C1) application to the media plane device, and the media plane device sends a response message (a media capability U1) to the control plane device.

4. The control plane device performs multimedia negotiation with the terminal based on the response message and sends a negotiation result (a media capability U2) to the media plane device and the service network element.

5. The control plane device receives an operation indication from the service network element and sends a control message (such as playback) to the media plane device.

6. The media plane device plays the multimedia resource to the terminal based on the control message.

When the terminal finishes the usage of the multimedia resource, the control plane device sends an on-hook disconnection message to the media plane device, and the media plane device ends the playback the multimedia resource according to the received on-hook disconnection message and releases the multimedia resource.

Figure 5:
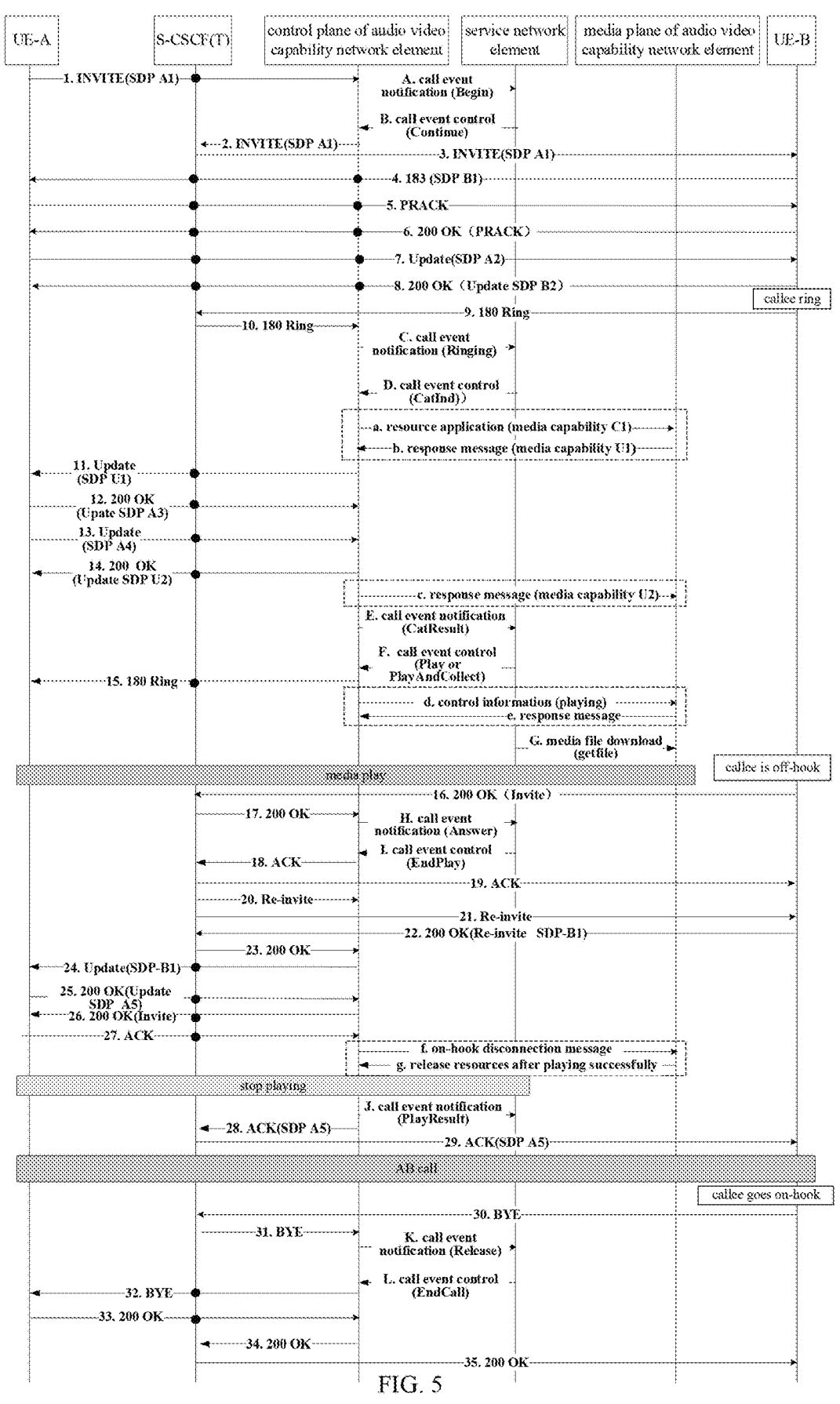
FIG. 5 is another flowchart illustrating a signaling interaction of an audio video capability network according to embodiments of the present disclosure.

In the embodiments of the present disclosure, taking the CRBT service as an example, as illustrated in FIG. 5, a flowchart of implementing a multimedia signaling of the audio video network element is described as follows:

1) A calling terminal performs audio calling, and sends an INVITE message via a core network at a calling side to a core network at a called side; the control plane device of the audio video capability network element at the called side receives the INVITE message. Only media lines are included in a calling-side media capability SDP A1 carried in the INVITE message.

A) In response to the INVITE message, the control plane device of the audio video capability network element reports a call event notification (Begin) to a service network element of the audio video capability network element. The call event notification (Begin) carries a number of the calling terminal and a number of a called terminal. The service network element returns a response (e.g., the call event control "Continue" shown in FIG. 5) for the call event notification.

B) When the service network element determines the called terminal is a CRBT user according to the number of the called terminal carried in the call event notification (Begin), the service network element indicates the control plane device of the audio video capability network element to continue calling the called terminal via the call event control (Continue).

2)-3) the control plane device of the audio video capability network element forwards the INVITE message to a core network S-CSCF, and the S-CSCF continues paging the called terminal.

4) The called terminal answers a 183 message after receiving the INVITE message, where the 183 message carries media information SDP B1 of the called terminal, the SDP B1 is an audio media format supported by the called terminal selected from the SDP A1, the 183 message carries 100rel indicating that the calling terminal needs to perform a PRACK acknowledgment, and the called terminal needs to apply for call resources.

5) After receiving the 183 message, the calling terminal sends the PRACK to the called terminal. The calling terminal acknowledges that the 183 message is received, and reserves the call resources.

6) The called terminal answers 200 OK to the calling terminal after receiving the PRACK.

7) After the call resources of the calling terminal are reserved at the above step 5), the calling terminal sends an UPDATE to the called terminal, that carries an audio media SDP A2 including the SDP B1, where resource reservation parameters are completed.

8) After the UPDATE is received, and after the called terminal knows according to the received UPDATE that the call resources have been reserved, the called terminal answers 200 OK that carries an audio media SDP B2 of the called terminal including the SDP A2, where the resource reservation parameters are completed.

9)-10) 180 message (180 Ring) is sent by the called terminal after the called terminal rings, and the 180

Ring is received by the control plane device of the audio video capability network element at the called side.

C) The control plane device of the audio video capability network element reports a call event notification (Ringing) to the service network element. The call event notification (Ringing) carries the media capability SDP A1 of the calling terminal.

D) The service network element issues an audio or video media negotiation call event control (CatInd) message, and obtains an SDP C1 (media capability C1) according to the played media content session description protocol (SDP) information and the media capability SDP A1 of the calling terminal.

a) The control plane device of the audio video capability network element sends the multimedia resource application to the media plane device of the audio video capability network element, and performs media negotiation with the terminal. The multimedia resource application carries a "media capability C1" during the media negotiation and includes an audio video media format, an SBC address and a port supported by the calling terminal.

b) The media plane device of the audio video capability network element, in combination with its own media capability "media capability C1", in response to the multimedia resource application from the control plane device of the audio video capability network element, completes the reservation of the multimedia resource, and sends a response message to the control plane device. The response message carries a "media capability U1" (SDP U1) and includes an audio video media format, an address and a port of the media plane device of the audio video capability network element.

11) In response to the received media capability U1, the control plane device of the audio video capability network element sends an Update message carrying the SDP U1 to the calling terminal and performs media negotiation with the calling terminal.

12) In response to the received Update message, the calling terminal answers 200 OK that carries an SDP A3. The audio video media format is selected from the SDP U1, and video media resource reservation parameters are not completed.

13) The calling terminal sends an UPDATE message to the control plane device of the audio video capability network element after completing reservation of the video media resource. The UPDATE message carries an SDP A4. If an audio-based CRBT is played, the steps 13 and 14 are not needed.

14) In response to the received UPDATE message, the control plane device of the audio video capability network element answers 200 OK that carries the SDP U2.

c) The control plane device of the audio video capability network element sends the response message to the media plane device of the audio video capability network element. The response message carries a media capability U2 (SDP U2) which is a negotiation result with a calling media, and includes an audio video media format, an SBC address and a port at the calling side.

E) The control plane device of the audio video capability network element reports the media negotiation result SDP U2 to the service network element via a calling event notification (CatResult) after completing media negotiation with the calling terminal.

F) In response to the CatResult, the service network element issues a call event control (Play or Play And-Collect) to the control plane device of the audio video capability network element to control the audio video capability network element to play a specified ring file.

15) The control plane device of the audio video capability network element sends a 180 Ring to the calling side. The 180 Ring carries a P-Early-Media header field and a value of the 180 Ring is sendrecv.

d) After the control plane device of the audio video capability network element sends the message 180 Ring to the calling terminal, a timer is configured 100 ms by default. The control plane device of the audio video capability network element sends control information to the media plane device of the audio video capability network element. The control information carries relevant information such as a number and a path of a ring file to be played.

e) In response to the received control information, the media plane device of the audio video capability network element makes a response message to the request, where the response message indicates the media plane device successfully played a specific ring file.

G) If the media plane device of the audio video capability network element has a ring file to be played, the step G) is not needed; if the media plane device of the audio video capability network element does not have the ring file, the ring file is downloaded from the service network element and stored locally in a manner of an HTTP stream. The media plane device of the audio video capability network element plays a media content to the calling terminal.

16-17) When the called terminal goes off-hook, the control plane device of the audio video capability network element receives a 200 OK response.

H) In response to the received 200 OK, the control plane device of the audio video capability network element reports a call event notification (Answer) message to the service network element.

I) In response to the received Answer, the service network element issues a call event control (EndPlay) message that indicates the control plane device of the audio video capability network element ends the media play.

18)-19) the control plane device of the audio video capability network element returns an ACK message to the called terminal.

20)-21) The control plane device of the audio video capability network element receives Re-invite message (not carrying an SDP) sent by S-CSCF and forwards the Re-invite message to the called terminal to acquire the latest media capability of the called terminal.

22-23) The called side answers 200 OK for the Re-invite message, where the 200 OK carries the latest media information SDP B1.

24) The control plane device of the audio video capability network element sends an Update message carrying the SDP B1 to the calling terminal, and the carried SDP B1 includes an audio video media format, a called SBC address and a port at the called side to update media information of the calling side to a call media.

25) The calling side answers 200 OK carrying an SDP A5.

26) The control plane device of the audio video capability network element forwards an off-hook INVITE 200 OK.

27) The calling terminal answers ACK.

f) The control plane device of the audio video capability network element sends an on-hook disconnection message to the media plane device of the audio video capability network element.

g) The media plane device of the audio video capability network element returns a successful playback result in response to the on-hook disconnection message, releases resources and ends the playback.

J) The control plane device of the audio video capability network element reports the playback result to the service network element via a call event notification (PlayResult) after receiving the playback result.

28)-29) The control plane device of the audio video capability network element sends an ACK to the called side, where the carried SDP A5 includes an SBC address and a port of the calling side. The calling side and the called side complete media negotiation, and the calling side and the called side are in a call state.

30-31) The called side goes on-hook

K) The control plane device of the audio video capability network element reports a call event notification (Release) to the service network element for disconnection.

L) The service network element issues a call event control (EndCall) to end the session, in response to the Release.

32)-35) The control plane device of the audio video capability network element transparently transmits a BYE to the calling terminal, and the calling terminal answers 200 OK to the control plane device, and the calling terminal and the called terminal end the call.

In the above flows, a), b), c), d), e), f), g) are working processes of the control plane device and the media plane device of the audio video capability network element. In the embodiments of the disclosure, the functions of the audio video capability network element are split to form a control plane network element and a media plane network element, and 7 pieces of message a), b), c), d), e), f), g) are added between the control plane device and the media plane device in the audio video capability network element to interact basic information, which simultaneously satisfies the requirement that the control plane device of the audio video capability network element must be close to the core network and the service network element for deployment (to reduce a signaling connection delay), and the requirement that the media plane device is deployed within the access province (to reduce a bandwidth requirement of the long-distance transmission and the IP bearing network).

In the embodiments of the disclosure, the investment cost is reduced while the user experience is improved. Taking a video-based CRBT service as an example, if the control plane device of the audio video capability network element is centrally deployed in the regional center province, while the media plane device of the audio video capability network element is deployed within the access province, which may effectively reduce the requirements for resources in the inter-province long distance transmission and IP bearing network. It is expected to save a 1-5 hundred million investment in the scenario where there are currently 300 million CRBT users in the near future and there will be 500 million CRBT users in future.

1. Number of video-based CRBT users (1) Number of video-based CRBT users: a number of video-based CRBT users for a certain operator is currently 300 million.

(2) Number of video-based CRBT users: a number of video-based CRBT users for a certain operator is estimated in future to be 500 million.

2. Estimation of the bandwidth requirements of the media play for the video-based CRBT (1) In consideration of the 720p resolution of the main streaming media video in the current network, bandwidth requirements of the media play for each 100 million video-based CRBT users are 600 Gbps, and the bandwidth requirements of the media play for 300 million video-based CRBT users are about 1800 Gbps.

(2) When the resolution of the media video is enhanced to 1080p in future, the bandwidth requirements of the media play for each 100 million video-based CRBT users are 1500 Gbps, and the bandwidth requirements of the media play for 300 million video-based CRBT users are about 7500 Gbps.

3. Investment saving analysis of the IP bearing network

According to an architecture of the IP bearing network and a comprehensive cost analysis of a BR/CR device, (1) a comprehensive cost of each 100GE port in the BR/CR device is 400 thousand RMB.

(2) in an IP bearing network route from the regional center province to the access province, a number of BR/CR device ports (i.e., the number of ports that may be saved by the solution of the present disclosure) that need to be passed is 12 in average.

(3) recently, 1500 Gbps bandwidth resource of the IP long-distance bearing network may be reduced and the 72 million RMB investment may be saved.

(4) in future, 7500 Gbps bandwidth resource of the IP long-distance bearing network may be reduced, and a 360 million RMB investment may be saved.

4. Investment saving analysis of the transmission device:

According to an architecture of the transmission network and a comprehensive cost analysis of the transmission device ports, (1) The comprehensive cost of each 100 Gbps port for the transmission device is 500 thousand RMB.

(2) The transmission network from the regional center province to the access province is estimated according to 4 ports of 2 sets of transmission devices (i.e., a number of ports that may be saved in the solution of the disclosure) that need to be passed.

(3) For the transmission device that may reduce the 1800 Gbps bandwidth resource recently, a 36 million RMB investment may be saved.

(4) For the transmission device that may reduce the 7500 Gbps bandwidth resource in future, a 150 million RMB investment may be saved.

In the embodiments of the disclosure, the audio video capability network element is divided into two parts, including a control plane device and a media plane device, where the control plane device is deployed near a core network and a service network element in a centralized manner; the media plane device is deployed in a distributed manner. The control plane device is respectively communicated with the service network element, the core network and the media plane device. The media plane device is respectively communicated with the service network element, the control plane device and the core network. As such, the investment and operational costs may be significantly reduced and the user experiences may be thus improved.

As illustrated in FIG. 6, a method for multimedia processing is further provided in the embodiments of the disclosure. The method is performed by the control plane device in the audio video capability network element in the above embodiment. The method includes following steps.

At step 110, a multimedia service event is received from the service network element.

At step 120, a multimedia resource application is sent to the media plane device based on the multimedia service event, and a response message is received from the media plane device.

At step 130, multimedia negotiation with a terminal is performed based on the response message and a negotiation result is sent to the media plane device and the service network element.

At step 140, an operation indication is received from the service network element and a control message is sent to the media plane device, so that the media plane device is enabled to play a multimedia resource to the terminal based on the control message.

When the terminal is hooked off, an on-hook disconnection message is sent to the media plane device based on off-hook information, so that the media plane device is enabled to release the multimedia resource.

The specific method steps in the embodiments of the disclosure are generally consistent with a working process of the control plane device in the embodiments of the audio video capability network element, which will not be described here.

A method for multimedia processing is provided in embodiments of the disclosure. The method is performed by the media plane device in the audio video capability network element. The method includes:

receiving a multimedia resource application from the control plane device, and sending a response message to the control plane device, so that the control plane device is enabled to perform multimedia negotiation with a terminal based on the response message, in which the multimedia resource application is generated by the control plane device based on a multimedia service event from the service network element;

receiving a negotiation result from the control plane device; and receiving a control message from the control plane device, and playing a multimedia resource to the terminal based on the control message, in which the control message is generated by the control plane device based on a received operation indication from the service network element.

The specific method steps in the embodiments of the disclosure are generally consistent with a working process of the media plane device in embodiments of the audio video capability network element, which will not be described here.

In the embodiments of the disclosure, the audio video capability network element is divided into two parts that include a control plane device and a media plane device, where the control plane device is deployed near a core network and a service network element in a centralized manner; and the media plane device is deployed in a distributed manner. The control plane device is respectively communicated with the service network element, the core network and the media plane device. The media plane device is respectively communicated with the service network element, the control plane device and the core network. As such, the investment and operational costs may be significantly reduced and the user experiences may be thus improved.

A network element device 700 is further provided according to the embodiments of the present disclosure. As illustrated in FIG. 7, the network element device includes a processor 701, a memory 702, a bus interface 703 and a transceiver 704. The processor 701 is in charge of managing the bus architecture and general processing. The memory

702 may store data used by the processor 701 in performing the operations. In the embodiments of the present disclosure, the network element device 700 may further include a program stored on the memory and executable by the processor 701. The program implements the steps of the method as described in the embodiments of the present disclosure when executed by the processor 701.

In some implementations, the bus architecture may include any number of interconnected buses and bridges, and specifically link various circuits for one or more processors represented by the processor 701 and various circuits of memories represented by the memory 702. In some implementations, the bus architecture may further link other circuits such as peripheral equipment, voltage regulators and power management circuits, which are well known in the art. Therefore, it will not be further described in the embodiments of the disclosure. In some implementations, the transceiver may be a plurality of elements, i.e., include a transmitter and a receiver, and units for communicating with various other apparatuses on transmission media.

A non-transitory processor-readable storage medium having a computer program stored thereon is further provided in the embodiments of the present disclosure. When the computer program is executed by a processor, various processes of the above method embodiments may be implemented, and same technical effects may be achieved, which will not be repeated here to avoid repetition. The computer-readable storage medium includes a read-only memory (ROM), a random-access memory (RAM), a magnetic disk or an optical disk.

The algorithms or displays provided herein are not inherently associated with any particular computer, virtual system, or other device. All the general-purpose systems may be used in conjunction with such teaching herein based on the disclosure. According to the above descriptions, it's obvious to construct a structure required by the system. In addition, the embodiments of the present disclosure are not specific to any particular programming language. It will be appreciated that the teachings of the present disclosure described herein may be implemented in a variety of programming languages, and the above description of specific languages is provided to disclose best implementations of the present disclosure.

In the description provided herein, numerous specific details are set forth. However, it is understood that the embodiments of the disclosure may be practiced without these specific details. In some instances, well-known methods, structures and techniques have not been shown in detail in order not to obscure an understanding of the description.

Similarly, it should be appreciated that in the above description of the example embodiments of the disclosure, various features in the embodiments of the disclosure are sometimes grouped together in a single embodiment, a single figure, or description thereof, for the purpose of streamlining the disclosure and aiding in understanding of one or more of the various invention aspects. However, the disclosed method should not be construed as reflecting the intention that the claimed disclosure requires more features than those expressly defined in each claim.

Those skilled in the art will appreciate that modules in the apparatus embodiments may be adaptively changed and disposed in one or more apparatuses different from the embodiment. The modules or units or components in the embodiments may be combined into one module or unit or component, and may be divided into a plurality of sub-modules or sub-units or sub-components. All the features disclosed in the description (including any accompanying claims, abstract and drawings), and all processes in any methods or all units in any apparatus disclosed may be used in combination, except that at least some of such features and/or processes or units are mutually exclusive. Features disclosed in the description (including any appended claims, abstract and drawings), may be replaced by alternative features with same, equivalent or similar purposes, unless expressly stated otherwise.

It should be noted that the above embodiments illustrate rather than limit the disclosure, and those skilled in the art may design alternative embodiments without departing from the scope of the appended claims. In the claims, any reference signs placed within parentheses shall not be construed as a limitation of the claims. The word "comprising" does not exclude the presence of elements or steps not listed in the claims. The word "a/an" or "one" preceding the element does not exclude the presence of a plurality of such elements. The disclosure may be implemented by means of a hardware including several different elements, and by means of a suitably programmed computer. In the unit claims enumerating several apparatuses, several of the apparatuses may be embodied by the same hardware. The terms such as first, second, third, etc. do not denote any order. These terms may be interpreted as names. The steps in the above embodiments should not be construed as a limitation of an execution sequence unless specifically stated.

What is claimed is:

1. An audio video capability network element, comprising:

a control plane device, deployed with a core network and a service network element; and a media plane device, deployed separately from the core network and the service network element;

wherein the control plane device is respectively communicated with the service network element, the core network and the media plane device; and the media plane device is respectively communicated with the service network element, the control plane device and the core network, and wherein the control plane device receives a call event notification and a service request initiated by the service network element;

the control plane device sends a multimedia resource application to the media plane device, and the media plane device sends a response message to the control plane device;

the control plane device performs multimedia negotiation with a terminal based on the response message and sends a negotiation result to the media plane device and the service network element;

the control plane device receives an operation indication from the service network element and sends a control message to the media plane device; and the media plane device plays a multimedia resource to the terminal based on the control message.

2. The audio video capability network element according to claim 1, wherein the control plane device, the core network and the service network element are deployed in a regional center province; and the media plane device is deployed in an access province corresponding to each regional center province.

3. The audio video capability network element according to claim 1, wherein the control plane device communicates with the service network element using a RESTFUL/HTTP (Representational State Transfer/Hypertext Transfer Protocol) message to perform call event notification, call event subscription, capability calling and nesting, and conflict handling.

4. The audio video capability network element according to claim 1, wherein the control plane device intercommunicates with a call session control function (CSCF) network element of the core network using a session initiation protocol (SIP) message to complete signal processing.

5. The audio video capability network element according to claim 1, wherein the control plane device communicates with the media plane device to perform call control and media negotiation.

6. The audio video capability network element according to claim 1, wherein the media plane device communicates with the service network element using a RESTFUL/HTTP (Representational State Transfer/Hypertext Transfer Protocol) message to complete media download.

7. A method for multimedia processing, performed by a control plane device comprised in an audio video capability network, the method comprising:

receiving a multimedia service event from a service network element;

sending a multimedia resource application to a media plane device comprised in the audio video capability network element based on the multimedia service event, and receiving a response message from the media plane device;

performing multimedia negotiation with a terminal based on the response message and sending a negotiation result to the media plane device and the service network element; and receiving an operation indication from the service network element and sending a control message to the media plane device, wherein the media plane device is enabled to play a multimedia resource to the terminal based on the control message;

wherein the control plane device is deployed with a core network and the service network element in a centralized manner, and the control plane device is respectively communicated with the service network element, the core network and the media plane device; the media plane device is deployed in a distributed manner, and the media plane device is respectively communicated with the service network element, the control plane device and the core network.

8. The method according to claim 7, wherein after receiving the operation indication from the service network element and sending the control message to the media plane device, the method further comprises:

sending an on-hook disconnection message to the media plane device based on off-hook information, wherein the media plane device is enabled to release the multimedia resource.

9. A network element device, comprising a processor and a memory storing a computer program capable of running on the processor, wherein when the processor is configured to run the computer program, the method according to claim 7 is executed.

10. A non-transitory processor readable storage medium storing a computer program, wherein the computer program is configured to cause a processor to execute the method according to claim 7.

11. The method according to claim 7, wherein the control plane device, the core network and the service network element are deployed in a regional center province; and the media plane device is deployed in an access province corresponding to each regional center province.

12. The method according to claim 7, wherein the control plane device communicates with the service network element using a RESTFUL/HTTP (Representational State Transfer/Hypertext Transfer Protocol) message to perform call event notification, call event subscription, capability calling and nesting, and conflict handling.

13. The method according to claim 7, wherein the control plane device intercommunicates with a call session control function (CSCF) network element of the core network using a session initiation protocol (SIP) message to complete signal processing.

14. The method according to claim 7, wherein the control plane device communicates with the media plane device to perform call control and media negotiation.

15. The method according to claim 7, wherein the media plane device communicates with the service network element using a RESTFUL/HTTP (Representational State Transfer/Hypertext Transfer Protocol) message to complete media download.

16. A method for multimedia processing, performed by a media plane device comprised in an audio video capability network, the method comprising:

receiving a multimedia resource application from a control plane device comprised in the audio video capability network element, and sending a response message to the control plane device, wherein the control plane device is enabled to perform multimedia negotiation with a terminal based on the response message, wherein the multimedia resource application is generated by the control plane device based on a multimedia service event from a service network element;

receiving a negotiation result from the control plane device; and receiving a control message from the control plane device, and playing a multimedia resource to the terminal based on the control message, wherein the control message is generated by the control plane device based on a received operation indication from the service network element;

wherein the control plane device is deployed with a core network and the service network element in a centralized manner, and the control plane device is respectively communicated with the service network element, the core network and the media plane device; the media plane device is deployed in a distributed manner, and the media plane device is respectively communicated with the service network element, the control plane device and the core network.

17. A network element device, comprising a processor and a memory storing a computer program capable of running on the processor, wherein when the processor is configured to run the computer program, the method according to claim 16 is executed.

18. A non-transitory processor readable storage medium storing a computer program, wherein the computer program is configured to cause a processor to execute the method according to claim 16.

* * * * *